(12) United States Patent
Probst et al.

(10) Patent No.: US 10,844,151 B2
(45) Date of Patent: Nov. 24, 2020

(54) FLUORINE-FREE AQUEOUS DISPERSIONS FOR THE FINISHING OF TEXTILE FABRICS

(71) Applicant: Huntsman Textile Effects (Germany) GMBH, Langweid A.L. (DE)

(72) Inventors: Dieter Probst, Gablingen (DE); Alfred Weihrather, Schwabmunchen (DE); Andreas Fuchs, Munich (DE); Isabella Rettenbacher, Gersthofen (DE)

(73) Assignee: HUNTSMAN TEXTILE EFFECTS (GERMANY) GmbH, Langweid A.L. (DE)

( * ) Notice: Subject to any disclaimer, the term of this patent is extended or adjusted under 35 U.S.C. 154(b) by 16 days.

(21) Appl. No.: 16/335,798

(22) PCT Filed: Sep. 11, 2017

(86) PCT No.: PCT/EP2017/072766
§ 371 (c)(1),
(2) Date: Mar. 22, 2019

(87) PCT Pub. No.: WO2018/054712
PCT Pub. Date: Mar. 29, 2018

(65) Prior Publication Data
US 2020/0017616 A1 Jan. 16, 2020

(30) Foreign Application Priority Data
Sep. 23, 2016 (EP) .................... 16190361

(51) Int. Cl.
| C08F 214/06 | (2006.01) |
| C08F 2/22 | (2006.01) |
| C08F 214/08 | (2006.01) |
| C08F 220/28 | (2006.01) |
| C08K 5/01 | (2006.01) |
| C08K 5/17 | (2006.01) |
| C08K 5/5419 | (2006.01) |
| C08L 91/06 | (2006.01) |
| D06M 13/02 | (2006.01) |
| D06M 15/248 | (2006.01) |
| D06M 15/263 | (2006.01) |
| D06M 101/02 | (2006.01) |
| D06M 101/32 | (2006.01) |
| C08F 220/18 | (2006.01) |

(52) U.S. Cl.
CPC ............. *C08F 214/06* (2013.01); *C08F 2/22* (2013.01); *C08F 214/08* (2013.01); *C08F 220/28* (2013.01); *C08K 5/01* (2013.01); *C08K 5/17* (2013.01); *C08K 5/5419* (2013.01); *C08L 91/06* (2013.01); *D06M 13/02* (2013.01); *D06M 15/248* (2013.01); *D06M 15/263* (2013.01); *C08F 220/1818* (2020.02); *D06M 2101/02* (2013.01); *D06M 2101/32* (2013.01); *D06M 2200/12* (2013.01)

(58) Field of Classification Search
CPC ........ C08F 214/06; C08F 214/08; C08F 2/22; C08F 220/28; C08F 220/818; C08K 5/01; C08K 5/17; C08K 5/5419; C08L 91/06; D06M 13/02; D06M 15/248; D06M 15/263; D06M 2101/02; D06M 2101/32; D06M 2200/12
USPC ....................................... 524/251
See application file for complete search history.

(56) References Cited

U.S. PATENT DOCUMENTS

| 3,248,352 A | 4/1966 | Marascia et al. |
| 2012/0015575 A1* | 1/2012 | Fuchs ............. C08F 220/18 442/79 |

FOREIGN PATENT DOCUMENTS

| EP | 1424433 A | 6/2004 |
| EP | 2889316 A | 7/2015 |
| WO | 2010115496 A | 10/2010 |

* cited by examiner

*Primary Examiner* — William K Cheung
(74) *Attorney, Agent, or Firm* — Huntsman Textile Effects (Germany) GmbH; Robert Diaz

(57) ABSTRACT

An aqueous dispersion free of fluorochemicals comprising (A) at least one copolymer obtained by polymerization of the following monomers a) at least one fluorine-free (meth) acrylate ester of a $C^{16}$-$C^{18}$ alcohol, b) at least one fluorine-free (meth)acrylate ester of a $C^{18}$-$C^{22}$ alcohol, c) at least one monomer selected from the group of vinyl chloride and vinylidene chloride, and, optionally, d) at least one monomer selected from the group of 2-hydroxyethyl(meth)acrylate and 3-chloro-2-hydroxyethyl(meth)acrylate, (B) at least one component selected from the group of a paraffin wax, (C) at least one surfactant, and (D) water, wherein the monomers a) and b) of copolymer (A) are distinct, and the copolymer (A) does not contain any polymerized units of styrene or α-methylstyrene, is useful for the finishing of natural and synthetic textile fabrics to endow the said fabrics with excellent water repellent properties.

9 Claims, No Drawings

FLUORINE-FREE AQUEOUS DISPERSIONS FOR THE FINISHING OF TEXTILE FABRICS

CROSS-REFERENCE TO RELATED APPLICATIONS

This application is the National Phase of International Application PCT/EP2017/072766 filed Sep. 11, 2017 which designated the U.S. and which claims priority to European App. Serial No. 16190361.2 filed Sep. 23, 2016. The noted applications are incorporated herein by reference.

The present disclosure relates to aqueous dispersions comprising a copolymer based on two distinct long hydrocarbon chain (meth)acrylic acid esters, a wax component and a surfactant, the preparation of the copolymer and a process for treating textile fabrics using the said aqueous dispersions of the copolymer. The aqueous dispersions according to the present disclosure are free of fluorochemicals and endow natural and synthetic textile fabrics with water repellent properties.

Over the past years, many countries have committed to improve the quality of the environment by saving natural resources and reducing the emission of substances which are harmful to the climate. Funds are provided by the governments to support the industry in achieving these goals. The consumer is asking for environmentally friendly textile products which are produced in accordance with highest ecological standards. Brands and retailers are conveying these demands into real requirements and textile manufacturers are continuously improving their production excellence by investing in modern equipment and selecting environmental friendly chemical substances.

It is known to furnish textile fabrics, such as woven, knits or nonwovens, with certain properties, for example, water repellency, by treating the fabrics with aqueous dispersions containing particular chemical ingredients. Water-repellent properties on textiles are achieved by using fluorine-containing products as such chemical ingredients. However, fluorine-containing products are costly and their use has been restricted due to the developing regulatory framework for chemicals. Alternatively, aqueous systems to obtain water-repellent properties on textiles have been suggested which comprise paraffin wax and acrylic polymers. Such systems are described for example in EP1424433A2 and WO2010115496A1. The aqueous dispersion disclosed in WO2010115496A1 comprises paraffin wax and a copolymer obtained from a (meth)acrylic acid ester and styrene or α-methylstyrene.

The prior art compositions do not satisfy all of the requirements expected nowadays, for example, excellent water repellent properties on different fabrics, especially fabrics made of synthetic fibers.

It is an object of the present disclosure to provide compositions that have high stability even after prolonged storage, that do not contain any fluoro chemicals or styrenes, and that provide excellent water-repellent properties on all textile fabrics including polyester containing fabrics.

The present disclosure also provides a process for obtaining excellent water-repellent properties on the said fabrics.

Accordingly, the present disclosure relates to an aqueous dispersion free of fluorochemicals comprising
(A) at least one copolymer obtained by polymerization of the following monomers
  a) at least one fluorine-free (meth)acrylate ester of a $C_{16}$-$C_{18}$ alcohol,
  b) at least one fluorine-free (meth)acrylate ester of a $C_{18}$-$C_{22}$ alcohol,
  c) at least one monomer selected from the group of vinyl chloride and vinylidene chloride, and, optionally,
  d) at least one monomer selected from the group of 2-hydroxyethyl(meth)acrylate and 3-chloro-2-hydroxyethyl(meth)acrylate
(B) at least one was selected from the group of a paraffin wax having a melting range of 55° C. to 75° C. and a silicon wax having a melting range of 25° C. to 55° C.,
(C) at least one surfactant, and
(D) water, wherein
the monomers a) and b) of copolymer (A) are distinct, and the copolymer (A) does not contain any polymerized units of styrene or α-methylstyrene.

The term "fluorine-free" in this context means that the respective compounds do not contain any fluoroalkyl groups.

The aqueous dispersions according to the present disclosure do neither contain any fluoro chemicals nor styrenes. They are also free of any N-methylol compounds. N-methylol compounds may release formaldehyde in undesirable quantities into the ambient atmosphere. Accordingly, the present disclosure further limits the number of ingredients used in the preparation of aqueous dispersions for textile applications which are potentially harmful to health and environment.

Monomer a) of the at least one copolymer (A) is at least one, for example one, two or three (meth)acrylate esters of a linear or branched $C_{16}$-$C_{18}$ alcohol. There come into consideration for such (meth)acrylate esters of a linear or branched $C_{16}$-$C_{18}$ alcohol, for example, hexadecylmethacrylate, heptadecylmethacrylate, octadecylmethacrylate, hexadecylacrylate, heptadecylacrylate and octadecylacrylate, or a mixture of at least two distinct (meth)acrylate esters of a $C_{16}$-$C_{18}$ alcohol, for example a mixture of hexadecylmethacrylate and octadecylmethacrylate, which is commercially available as industrial grade Stearylmethacrylate (CAS: 90551-83-0).

Monomer b) of the at least one copolymer (A) is at least one, for example one, two or three (meth)acrylate esters of a linear or branched $C_{18}$-$C_{22}$ alcohol. There come into consideration for such (meth)acrylate esters of a linear or branched $C_{18}$-$C_{22}$ alcohol, for example, octadecylmethacrylate, icosyl methacrylate, docosylmethacrylate, octadecylacrylate, icosyl acrylate, docosylacrylate or a mixture of at least two distinct (meth)acrylate esters of a $C_{18}$-$C_{22}$ alcohol, for example a mixture of octadecylmethacrylate, icosyl methacrylate and docosylmethacrylate, which is commercially available as industrial grade Behenylmethacrylate (CAS: 90551-86-3).

Monomers a) and b) of copolymer (A) are distinct, that is monomer a) and monomer b) are not identical as to the chain length of the alcohol, for example, monomer a) and monomer b) each cannot be a (meth)acrylate ester of the same $C_{18}$ is alcohol. However, each of the monomers a) and b) can contain a (meth)acrylate ester of the same alcohol, for example, a $C_{18}$ alcohol, if monomer a) or the monomer b), or the monomers a) and b), is a mixture of at least two (meth)acrylate esters, wherein only one of the at least two (meth)acrylate esters is an ester of the same alcohol, for example, a $C_{18}$ alcohol. Accordingly, monomer a) may be a mixture of hexadecylmethacrylate and octadecylmethacrylate, and monomer b) may be a mixture of octadecylmethacrylate, icosyl methacrylate and docosylmethacrylate.

Monomer a) or monomer b) each is an acrylate ester or a methyacrylate ester, or a mixture of an acrylate ester and a methyacrylate ester, in a molar ratio of, for example, 1:1, 1.5:1 or 1:1.5.

Monomer a) and monomer b) of copolymer (A) are commercially available or can be prepared by generally known methods.

In one embodiment, the at least one (meth)acrylate esters a) and b) used for preparing the at least one copolymer (A) contain a saturated alcohol, that is the at least one (meth) acrylate esters a) and b) do not contain an unsaturated alcohol with carbon-carbon multiple bonds.

The at least one monomer c) selected from the group of vinyl chloride and vinylidene chloride is commercially available.

The at least one monomer d) selected from the group of 2-hydroxyethyl(meth)acrylate and 3-chloro-2-hydroxyethyl (meth)acrylate is not strictly required in the preparation of the at least one copolymer (A) but may be used to improve the effect level on synthetic textile fabrics.

The at least one copolymer (A) is obtained by polymerization of a) at least one (meth)acrylate ester of a $C_{16}$-$C_{18}$ alcohol, b) at least one (meth)acrylate ester of a $C_{18}$-$C_{22}$ alcohol, c) at least one monomer selected from the group of vinyl chloride and vinylidene chloride, and, optionally, d) at least one monomer selected from the group of 2-hydroxyethyl (meth)acrylate and 3-chloro-2-hydroxyethyl(meth) acrylate. Beside the monomers a), b), c) and optionally d), other suitable monomers may be used in the polymerization reaction, as long as these monomers do not deteriorate the advantageous effect achieved by the present disclosure. Surprisingly, styrene or α-methylstyrene are not required for the preparation of the at least one copolymer (A) to achieve the advantageous effect, and are, therefore, omitted. Preferably, the at least one copolymer (A) is obtained by polymerization of monomers a), b), c) and optionally d) without using any other monomers, that is the at least one copolymer (A) advantageously consists of the monomers a), b), c) and optionally d).

The at least one copolymer (A) can be prepared from the monomers a), b), c) and optionally d) by following methods generally known in the art. The copolymerization is typically carried out as a free-radical polymerization by using a free-radical polymerization initiator. Useful as a free-radical polymerization initiator for the purposes of the present disclosure include azo compounds, for example, Vazo 56 or Wako V-50 (CAS: 2997-92-4) from DuPont or WAKO Pure Chemical Industries, respectively. The free-radical polymerization initiator is applied in a customary known amount, which is in a range of, for example, from 2.5% to 5% by weight, based on the total weight of monomers a), b), c) and optionally d).

The at least one copolymer (A) is obtained from polymerizing with one another 20% to 50% by weight, preferably 30% to 40% by weight of monomer a),
20% to 50% by weight, preferably 30% to 40% by weight of monomer b),
10% to 40% by weight, preferably 20% to 30% by weight of monomer c),
0% to 10% by weight, preferably 0% to 5% by weight of monomer d)
based on the total weight of monomers a), b), c) and d) used in the polymerization reaction, the total of monomers a), b), c) and d) used in the polymerization reaction being 100% by weight.

Copolymer (A) is novel. Accordingly, the present disclosure is also directed to copolymer (A) obtained from polymerizing with one another of
a) at least one fluorine-free (meth)acrylate ester of a $C_{16}$-$C_{18}$ alcohol,
b) at least one fluorine-free (meth)acrylate ester of a $C_{18}$-$C_{22}$ alcohol,
c) at least one monomer selected from the group of vinyl chloride and vinylidene chloride, and, optionally,
d) at least one monomer selected from the group of 2-hydroxyethyl(meth)acrylate and 3-chloro-2-hydroxyethyl (meth)acrylate, wherein the meanings and preferences given above apply.

The at least one wax component (B) is selected from the group of a paraffin wax having a melting range of 55° C. to 75° C. and a silicon wax having a melting range of 25° C. to 55° C. Paraffin and silicon waxes having a melting range outside these limits are not very suitable for dispersions according to the present disclosure. Paraffin and silicon waxes having a lower melting range than stated above do not provide the desired effect level concerning water repellency of textiles treated with the aqueous dispersions. They also lead to reduced laundering durability on the part of treated textiles. Paraffin and silicon waxes having a melting range higher than indicated above may lead to acceptable water repellency and laundering durability for the textiles but cause these aqueous dispersions to have an increased viscosity, so that processability of these dispersions becomes inadequate. Moreover, the dispersions are then costlier and less convenient to manufacture. Suitable paraffin waxes are known and described, for example, in "Rompp Chemie-Lexikon", 9th edition, Georg-Thieme-Veulag, Stuttgart-New York, chapters headed "Paraffin" and "Wachse". Suitable silicon waxes are, for example, polysiloxanes containing alkyl side chains. The at least one wax (B) useful for the dispersions of the present disclosure are commercially available, for example, Sasolwax 7040 of Sasol Wax GmbH as a suitable paraffin wax, and Silwax D222 of Siltech Corporation as a suitable silicon wax.

If a paraffin wax is used as the at least one component (B), the aqueous dispersion according to the present disclosure suitably comprises, for example,
20 to 60% by weight, preferably 30 to 50% by weight, especially 35 to 45% by weight of component (A), and
40 to 80% by weight, preferably 50 to 70% by weight, especially 55 to 65% by weight of a paraffin wax having a melting range of 55° C. to 75° C. as component (B), based on the total weight of component (A) and component (B) in the aqueous dispersion, the total of components (A) and (B) being 100/o by weight.

If a silicon wax is used as the at least one component (B), the aqueous dispersion according to the present disclosure suitably comprises, for example,
60 to 95% by weight, preferably 70 to 90% by weight, especially 75 to 85% by weight of component (A), and
5 to 40% by weight, preferably 10 to 30% by weight, especially 15 to 25% by weight of a silicon wax having a melting range of 25° C. to 55° C. as component (B), based on the total weight of component (A) and component (B) in the aqueous dispersion, the total of components (A) and (B) being 100% by weight.

The at least one surfactant (C) is a dispersant or a mixture of dispersants to ensure the stability of the dispersion. Useful dispersants include known commercially available surface-active compounds such as nonionic ethoxylated compounds, for example ethoxylated alcohols or ethoxylated carboxylic acids, cationic surfactants such as quaternary ammonium salts, or fatty amines. Appropriately, the fatty amines are applied in combination with a suitable acid, for example, an organic acid such as acetic acid.

Preferably, the at least one surfactant (C) is a fatty amine, or a fatty alcohol ethoxylate, or a surfactant mixture of a fatty amine and a fatty alcohol ethoxylate. A suitable fatty amine is, for example, a $C_{12}$-$C_{22}$ alkyl dimethyl amine, such as lauryldimethyl amine, tetradecyldimethyl amine, hexadecyldimethyl amine, dimethylcoconut amine, octadecyldimethyl amine, docosyldimethyl amine, especially, octadecyldimethyl amine. Suitable fatty amines are commercially available. Suitable fatty alcohol ethoxylates are branched or unbranched. A suitable branched secondary alcohol ethoxylate is, for example, polyethylene glycol trimethylnonyl ether, such as Tergitol TMN-10 from Dow.

The dispersions of the present disclosure contain 0.5% to 3% by weight of the at least one surfactant (C) based on the total weight of the dispersion. Preferably, the fatty amine is applied in an amount of 0.5% to 2% by weight based on the total weight of the dispersion. The aqueous dispersions of the present disclosure have very high stability.

The aqueous dispersions according to the present disclosure can be prepared in a one-step process or a two-step process.

In one embodiment of the present disclosure a two-step process is applied if the wax (B) is a paraffin wax. Accordingly, an aqueous dispersion of the paraffin wax (B) is prepared by heating the wax in a vessel to approximately 20° C. above its melting point. Appropriately, a small amount of a suitable solvent, for example, dipropylene glycol is added. A hot aqueous mixture of the at least one surfactant (C) is prepared separately and added to the molten wax under stirring using a Turrax, which is followed by high-pressure dispersing, for example, at 250 bars and 85 to 90° C. In a separate vessel an aqueous dispersion of copolymer (A) is prepared by mixing the at least one surfactant (C), monomers a), b) and optionally d), and warm water. A dispersion is obtained by high-pressure dispersing the mixture, for example, at 250 bars and 50 to 60° C. The dispersion is cooled to room temperature, the polymerization initiator and monomer c) are added, and polymerization is accomplished for several hours at a temperature of, for example, from 55 to 65° C. The aqueous dispersion of the paraffin wax (B) and the aqueous dispersion of copolymer (A) are combined to yield a stable aqueous dispersion.

In another embodiment of the present disclosure a one-step process is applied if the wax (B) is a silicon wax. Accordingly, an aqueous dispersion is prepared by adding to a vessel the at least one surfactant (C), appropriately, a small amount of a suitable solvent, for example, dipropylene glycol, the silicon wax (B), monomers a), b) and optionally d), and warm water under stirring using a Turrax. A dispersion is obtained by high-pressure dispersing the mixture, for example, at 250 bars and 50 to 60° C. The dispersion is cooled to room temperature, the polymerization initiator and monomer c) are added, and polymerization is carried out for several hours at a temperature of, for example, from 55 to 65° C. to yield a stable aqueous dispersion.

If desired, further ingredients which are known to be useful as constituents of textile-treating compositions may be added to the resulting aqueous dispersion of the present disclosure.

The treatment of textile fabrics can be carried out by the following generally customary methods, for example by padding, subsequent drying and, where appropriate, curing at temperatures of, for example, from 90 to 190° C., preferably 100 to 180° C. In a certain embodiment low temperature curing is carried out at 100° C. In another embodiment curing is carried out at 150° C. Textile fabrics to be treated with the aqueous dispersions according to the present disclosure are, for example, cotton, polyester or a cotton-polyester blend. Usually, such fabrics are wovens, knits or nonwovens.

Dispersions according to the present disclosure are particularly useful for conferring water-repellent properties on natural and synthetic textile fabrics. Surprisingly, the desired water repellency effect level is achieved even on synthetic textile fabrics, such as polyester fabrics or mixed fabrics of cotton and polyester. The effect level may be enhanced by using in combination with the aqueous dispersions of the present disclosure an extender for oil and water repellent products, for example, PHOBOL® XAN extender (Huntsman Corp.). The textile fabrics treated with the aqueous dispersions according to the present disclosure are especially suitable for outerwear.

The following Examples serve to illustrate the present disclosure. Unless otherwise indicated, the temperatures are given in degrees Celsius, parts are parts by weight and percentages relate to percent by weight. Parts by weight relate to parts by volume in a ratio of kilograms to litres.

Chemicals:
Octadecyldimethyl amine (CAS: 124-28-7)
Tergitol TMN-10: >87% Polyethylene glycol trimethylnonyl ether (CAS: 60828-78-6)
Dipropylene glycol (CAS: 25265-71-8)
Acetic acid (CAS: 64-19-7)
Paraffin 2222 or Sasolwax 7040 melting at ca 70° C. (CAS: 8002-74-2; 64742-51-4)
Silwax D222, melting range of 34 to 42° C. (CAS: 73891-93-7)
Behenylmethacrylate 1822 (BEMA 1822)(CAS: 90551-86-3)
Stearylmethacrylate (MA 16-18)(CAS: 90551-83-0)
2-Hydroxyethylmethacrylate (CAS: 868-77-9)
Vinylidene chloride (CAS: 75-35-4)
Wako V 50: 2,2'-azobis(2-methylpropionamidine) dihydrochloride (CAS: 2997-92-4)
PHOBOL® XAN extender for oil and water repellent products

EXAMPLE 1 a) A vessel is charged with 2.2 parts of octadecyldimethyl amine, 1.1 parts of Tergitol TMN-10, 6.6 parts of dipropylene glycol, and 2.0 parts of acetic acid (60%). To this mixture are added 15.0 parts of Behenylmethacrylate, 15.0 parts of Stearylmethacrylate, and 0.7 parts of 2-hydroxyethylmethacrylate and, finally, 110 parts of warm water. The mixture is stirred with a Turrax for about 1 minute, which is followed by high-pressure dispersing at a pressure of 250 bar and a temperature of from 50 to 60° C. to yield a stable emulsion. The emulsion obtained is cooled to a temperature of about 20° C. After addition of 0.4 parts of Wako V 50 in 4.6 parts of water and 12.0 parts of vinylidene chloride polymerization is carried out in a nitrogen atmosphere at 65° C. for about 8 hours. 152 parts of an aqueous copolymer dispersion are obtained (40.6 parts of product after drying at 120° C. for 90 minutes).

b) In a vessel 60.0 parts of Paraffin 2222 or Sasolwax 7040 are melted at a temperature of about 90° C. 10.0 parts of dipropylene glycol are added to the hot melt of the paraffin wax obtained. A separate vessel is charged under stirring with 3.4 parts of octadecyldimethyl amine, 1.6 parts of Tergitol TMN-10, and 4.0 parts of acetic acid (60%), and, finally, 200 parts of hot water. The mixture obtained is added to the molten wax under stirring. Subsequently, the resulting mixture is stirred with a Turrax for about 1 minute which is followed by high-pressure dispersing at a pressure of 250 bar and a temperature of from 85 to 90° C. to yield 265 parts of a stable dispersion.

An aqueous dispersion according to the present disclosure is obtained by mixing 56.3 parts of the dispersion obtained by step a) and 155.8 parts of the dispersion obtained by step b).

EXAMPLE 2

A vessel is charged with 2.2 parts of octadecyldimethyl amine, 1.1 parts of Tergitol TMN-10, 6.6 parts of dipropylene glycol, and 2.0 parts of acetic acid (60%). To this mixture are added 8.5 parts of silicon wax, 15.0 parts of Behenylmethacrylate, 15.0 parts of Stearylmethacrylate, and 0.7 parts of 2-hydroxyethylmethacrylate and, finally, 110 parts of warm water. The mixture is stirred with a Turrax for about 1 minute, followed by high-pressure dispersing at a pressure of 250 bar and a temperature of from 50 to 60° C. to yield a stable emulsion. The emulsion obtained is cooled to a temperature of about 20° C. After addition of 0.5 parts of Wako V 50 in 4.5 parts of water and 12.0 parts of vinylidene chloride polymerization is carried out in a nitrogen atmosphere at 65° C. for about 8 hours. 155 parts of an aqueous dispersion according to the present disclosure are obtained (47.3 parts of product after drying at 120° C. for 90 minutes).

The following examples describes the treatment of different textile fabrics with a dispersion prepared as per Example 1 and Example 2.

APPLICATION EXAMPLES (FINISHING)

Polyester: a woven 100% polyester fabric is padded with a liquor containing 1 g/l of 60% acetic acid, 5 g/l of a wetting agent (INVADINE® PBN), and 40 g/l (80 g/1) of either the dispersion of Example 1 or the dispersion of Example 2 (liquor pick-up 59%).

Cotton-polyester blend: a woven fabric is treated in a pad-mangle with a liquor containing 1 g/l of 60% acetic acid, 5 g/l of a wetting agent (INVADINE® PBN), and 40 g/l (80 g/l) of either the dispersion of Example 1 or the dispersion of Example 2 (liquor pick-up 51%).

Cotton: a woven cotton fabric (100%) is treated in a pad-mangle with a liquor containing 1 g/l of 60% acetic acid, 5 g/l of a wetting agent (INVADINE® PBN), and 40 g/l (80 g/l) of either the dispersion of Example 1 or the dispersion of Example 2 (liquor pick-up 69%).

The above application examples are repeated by using aqueous treatment compositions which in addition to the ingredients indicated above contain 5 g/l (10 g/l) of PHOBOL® XAN extender.

After padding, the fabrics (cotton, polyester and cotton-polyester blend) are dried at 110° C. for 10 minutes and then cured at 150° C. for 5 minutes.

The finished fabrics obtained as per the application examples are subjected to the following tests:

(I) Spray test as per AATCC 22-2005, ISO 4920 (EN 24 920)

(II) Bundesmann Test as per DIN EN 29865, ISO 9865

The test results are summarized below in Tables 1 to 3.

TABLE 1

Results for polyester fabric

| Test | Ex1(40)[a] | Ex1(80)[b] | Ex1(40)[a] PL(5)[c] | Ex1(80)[b] PL(10)[d] | Ex2(40)[a] | Ex2(80)[b] | Ex2(40)[a] PL(5)[c] | Ex2(80)[b] PL(10)[d] |
|---|---|---|---|---|---|---|---|---|
| (I) initial[e] | 100 | 100 | 100 | 100 | 100 | 100 | 100 | 100 |
| (I) wash[f] | 100 | 100 | 95 | 100 | 100 | 100 | 100 | 100 |
| (II) [%] | 21.3 | 20.2 | 9 | 4.7 | 16.2 | 14.1 | 9 | 3.7 |
| (II) [grade] | 2, 2, 2 | 2, 2, 2 | 4, 3, 3 | 5, 4, 4 | 2, 2, 2 | 2, 2, 2 | 2, 2, 2 | 3, 3, 3 |
| (II) [ml] | 13 | 7 | 2 | 1 | 2 | 2 | 1 | 1 |

[a] 40 g/l of dispersion of Example 1 (Ex1) or Example 2 (Ex2).
[b] 80 g/l of dispersion of Example 1 (Ex1) or Examle 2 (Ex2).
[c] 5 g/l of PHOBOL ® XAN extender.
[d] 10 g/l of PHOBOL ® XAN extender.
[e] initial grade after finishing of the fabric.
[f] grade after 20× washings and laundering of the finished frabric 20× 7AL TD (laundry tumble dry).

TABLE 2

Results for cotton-polyester blend fabric

| Test | Ex1(40)[a] | Ex1(80)[b] | Ex1(40)[a] PL(5)[c] | Ex1(80)[b] PL(10)[d] | Ex2(40)[a] | Ex2(80)[b] | Ex2(40)[a] PL(5)[c] | Ex2(80)[b] PL(10)[d] |
|---|---|---|---|---|---|---|---|---|
| (I) initial[e] | 100 | 100 | 100 | 100 | 100 | 100 | 100 | 100 |
| (I) wash[f] | 90 | 100 | 95 | 100 | 90 | 100 | 100 | 100 |
| (II) [%] | 8.4 | 8.1 | 5.3 | 4.2 | 6.1 | 5.2 | 4.5 | 3.7 |
| (II) [grade] | 4, 4, 4 | 4, 4, 4 | 5, 5, 5 | 5, 5, 5 | 4, 4, 4 | 4, 4, 4 | 4, 4, 4 | 4, 4, 4 |
| (II) [ml] | 5 | 3 | 4 | 3 | 3 | 4 | 3 | 4 |

[a] to [f] are defined as given under Table 1

TABLE 3

Results for cotton fabric

| Test | Ex1(40)$^a$ | Ex1(80)$^b$ | Ex1(40)$^a$ PL(5)$^c$ | Ex1(80)$^b$ PL(10)$^d$ | Ex2(40)$^a$ | Ex2(80)$^b$ | Ex2(40)$^a$ PL(5)$^c$ | Ex2(80)$^b$ PL(10)$^d$ |
|---|---|---|---|---|---|---|---|---|
| (I) initial$^e$ | 90 | 100 | 100 | 100 | 100 | 100 | 100 | 100 |
| (I) wash$^f$ | 70 | 90 | 90 | 100 | 80 | 90 | 95 | 95 |
| (II) [%] | 25.7 | 17.4 | 20.9 | 9 | 19.8 | 11.3 | 14.9 | 8.8 |
| (II) [grade] | 1, 1, 1 | 4, 3, 2 | 2, 1, 1 | 5, 4, 3 | 4, 2, 2 | 4, 4, 3 | 4, 2, 2 | 4, 4, 4 |
| (II) [ml] | 20 | 7 | 3 | 3 | 3 | 2 | 2 | 3 |

$^a$ to $^f$ are defined as given under Table 1

What is claimed is:

1. An aqueous dispersion free of fluorochemicals comprising
    (A) at least one copolymer obtained by polymerization of the following monomers
        a) at least one fluorine-free (meth)acrylate ester of a $C_{16}$-$C_{18}$ alcohol,
        b) at least one fluorine-free (meth)acrylate ester of a $C_{18}$-$C_{22}$ alcohol,
        c) at least one monomer selected from the group of vinyl chloride and vinylidene chloride, and, optionally,
        d) at least one monomer selected from the group of 2-hydroxyethyl(meth)acrylate and 3-chloro-2-hydroxyethyl(meth)acrylate
    (B) at least one component selected from the group of a paraffin wax having a melting range of 55° C. to 75° C. and a silicon wax having a melting range of 25° C. to 55° C.,
    (C) at least one surfactant, and
    (D) water, wherein the monomers a) and b) of copolymer (A) are distinct, and the copolymer (A) does not contain any polymerized units of styrene or α-methylstyrene.

2. The aqueous dispersion according to claim 1, comprising 20% to 60% by weight of component (A), and 40% to 80% by weight of a paraffin wax having a melting range of 55° C. to 75° C. as component (B), based on the total weight of component (A) and component (B) in the aqueous dispersion.

3. The aqueous dispersion according to claim 1, comprising 60% to 95% by weight of component (A), and 5% to 40% by weight of a silicon wax having a melting range of 25° C. to 55° C. as component (B), based on the total weight of component (A) and component (B) in the aqueous dispersion.

4. The aqueous dispersion according to claim 1, wherein the at least one copolymer (A) is obtained from polymerizing with one another 20% to 50% by weight of monomer a), 20% to 50% by weight of monomer b), 10% to 40% by weight of monomer c), 0% to 10% by weight of monomer d), based on the total weight of monomers a), b), c) and d) used in the polymerization reaction.

5. The aqueous dispersion according to claim 1, wherein the at least one surfactant is selected from a group consisting of a fatty amine, a fatty alcohol ethoxylate, and a surfactant mixture of a fatty amine and a fatty alcohol ethoxylate.

6. A process for treating a textile fabric, which comprises applying an aqueous dispersion according to claim 1, to the textile fabric.

7. The process according to claim 6, wherein the textile fabric is a cotton, polyester or a cotton-polyester blend fabric.

8. A copolymer obtained by polymerization of the following monomers
    a) at least one fluorine-free (meth)acrylate ester of a $C_{16}$-$C_{18}$ alcohol,
    b) at least one fluorine-free (meth)acrylate ester of a $C_{18}$-$C_{22}$ alcohol,
    c) at least one monomer selected from the group of vinyl chloride and vinylidene chloride, and, optionally,
    d) at least one monomer selected from the group of 2-hydroxyethyl(meth)acrylate and 3-chloro-2-hydroxyethyl(meth)acrylate, wherein monomer a) and monomer b) are distinct.

9. The aqueous dispersion according to claim 1 wherein the at least one copolymer (A) is obtained from polymerizing with one another 30% to 40% by weight of monomer a), 30% to 40% by weight of monomer b), 20% to 30% by weight of monomer c), 0% to 5% by weight of monomer d), based on the total weight of monomers a), b), c) and d) used in the polymerization reaction.

* * * * *